(12) United States Patent
Timmermans et al.

(10) Patent No.: US 8,274,872 B2
(45) Date of Patent: Sep. 25, 2012

(54) OPTICAL RECORD CARRIER WITH A VISUALLY DETECTABLE PATTERN AS WELL AS AN APPARATUS AND A METHOD FOR RECORDING A VISUALLY DETECTABLE PATTERN ON AN OPTICAL RECORD CARRIER

(75) Inventors: Mathias Martinus Maria Timmermans, Weert (NL); Markus Wilhelmus Maria Coopmans, Helden (NL); Maarten Kuijper, Helmond (NL)

(73) Assignee: Lite-On It Corporation, Taipei (TW)

( * ) Notice: Subject to any disclaimer, the term of this patent is extended or adjusted under 35 U.S.C. 154(b) by 1073 days.

(21) Appl. No.: 12/188,015

(22) Filed: Aug. 7, 2008

(65) Prior Publication Data

US 2009/0116362 A1     May 7, 2009

Related U.S. Application Data

(60) Provisional application No. 60/954,520, filed on Aug. 7, 2007.

(51) Int. Cl.
    *G11B 7/00* (2006.01)
(52) U.S. Cl. ............... 369/53.21; 369/59.25; 369/83

(58) Field of Classification Search .......... 369/100
    See application file for complete search history.

(56) References Cited

U.S. PATENT DOCUMENTS

| | | | | |
|---|---|---|---|---|
| 4,967,286 | A * | 10/1990 | Nomula et al. | 386/232 |
| 6,490,681 | B1 * | 12/2002 | Kobayashi et al. | 713/171 |
| 6,973,014 | B1 * | 12/2005 | Ihde | 369/30.21 |
| 7,095,429 | B2 * | 8/2006 | Kwasny et al. | 347/224 |
| 7,215,352 | B2 * | 5/2007 | Onodera et al. | 347/225 |
| 7,222,306 | B2 * | 5/2007 | Kaasila et al. | 715/801 |
| 7,331,055 | B2 * | 2/2008 | Onodera et al. | 720/718 |
| 7,492,385 | B2 * | 2/2009 | Kwasny et al. | 347/224 |
| 7,496,015 | B2 * | 2/2009 | Nakamura | 369/53.17 |
| 7,688,339 | B2 * | 3/2010 | Raaymakers et al. | 347/225 |
| 2004/0141385 | A1 * | 7/2004 | Pettigrew et al. | 365/200 |

* cited by examiner

*Primary Examiner* — Wayne Young
*Assistant Examiner* — Brian Butcher
(74) *Attorney, Agent, or Firm* — WPAT, PC; Justin King

(57) ABSTRACT

A system is described comprising an optical record carrier and an apparatus for recording the optical record carrier. The apparatus comprises a facility (20) for generating a visually detectable pattern at a physical location on the record carrier (40), and a facility (20) for storing pattern information. The pattern information comprises at least first information indicative for the physical location.

3 Claims, 10 Drawing Sheets

US 8,274,872 B2

OPTICAL RECORD CARRIER WITH A VISUALLY DETECTABLE PATTERN AS WELL AS AN APPARATUS AND A METHOD FOR RECORDING A VISUALLY DETECTABLE PATTERN ON AN OPTICAL RECORD CARRIER

CROSS-REFERENCE TO RELATED APPLICATIONS

This application claims the priority benefit of Timmermans et al., U.S. Provisional Patent Application Ser. No. 60/954,520, filed on Aug. 7, 2007, the contents of which are expressly incorporated herein by reference in their entirety, including any references contained therein The disclosures of the above-identified related provisional and non-provisional applications are expressly incorporated herein by reference in their entirety including the disclosure of any references contained therein.

FIELD OF THE INVENTION

The present invention relates to an optical record carrier, such as an optical disc or card with a visually detectable pattern. The present invention further relates to an apparatus for recording a visually detectable pattern on an optical record carrier. The present invention further relates to an apparatus for recording a visually detectable pattern on an optical record carrier.

BACKGROUND

In this application a visually detectable pattern, also denoted as a label or visual image herein below, is understood to be a pattern that can be recognized and interpreted by an individual without additional means.

US Published Application 2004/0062179 describes an optical disc recording apparatus capable of forming a visually detectable image on an optical disc. The visually detectable image comprises for example a logo, a sequence of characters or a combination thereof. In this way a user does not need a reading device to recognize the contents of the optical disc. A simple visual inspection suffices.

The known recording apparatus reserves a central part of the optical disc for storage of data and a peripheral part for the visually detectable image. Once the image is arranged at the periphery, the full remaining area on the disc is not available for recording data. Only a dedicated recording apparatus aware of the peripheral visually detectable image is capable of adding data in the remaining area of the disc. Therefore, in this way it is only possible to apply the image after the optical disc is finalized.

SUMMARY OF THE INVENTION

It is a purpose to provide an improved method and apparatus of recording a visually detectable pattern at an optical record carrier. It is a further purpose to provide an improved record carrier.

According to an aspect of the invention, an apparatus for recording an optical record carrier comprises:
- a facility for generating a visually detectable pattern at a physical location on the record carrier, and
- a facility for storing pattern information, the pattern information comprising at least first information indicative for the physical location.

The pattern information is similar to other machine-readable data usually stored in the form of marks and is preferably encoded by means of a channel code, In an exemplary embodiment the pattern information may be generated at the apparatus. An extended embodiment of an apparatus may for example have a list of pattern information for a plurality of optical record carriers and be capable of selecting the proper pattern information for a particular record carrier based on the information present on the record carrier. The extended apparatus may, for example, be used for storage of medical information. In that case the pattern information comprises for example a patient number and a date.

Preferably the pattern information is present at the optical record carrier having the visually detectable pattern itself. In this way the visually detectable pattern at the optical record carrier can easily be modified, moved etc at another apparatus capable of reading the visually detectable pattern.

According to an aspect of the invention an optical record carrier comprises a visually detectable pattern at a physical location on the record carrier, the record carrier further comprising pattern information including at least first information indicative for the physical location of the pattern.

According to an aspect of the invention a method for providing an optical record carrier comprises the steps of:
- generating a visually detectable pattern at a physical location of the record carrier on the basis of second information representing the visually detectable pattern to be recorded, and first information indicative for the physical location on the record carrier where the pattern is to be recorded, and
- storing pattern information on the optical record carrier comprising at least the first information.

A disc shaped optical record carrier recorded by the present invention may, for example, comprise an inner portion completely occupied by data and an outer portion occupied by the visually detectable pattern. The user wanting to add additional data to the disc may request the first information indicative for the physical location of the visually detectable pattern and release the outer portion to overwrite this by further user data. Alternatively the user may decide to move the visually detectable pattern to an inner location of the disc. In this way the visually detectable pattern requires less area of the disc, so that also additional data can be recorded on the disc. If additionally second information representing the visually detectable pattern is stored, the visually detectable pattern can be regenerated at its new location from this stored data.

According to a still further aspect of the invention an apparatus for providing an optical record carrier comprises,
- a facility for receiving second information representing the visually detectable pattern to be recorded,
- a facility for receiving first information indicative for a physical location on the record carrier where the pattern is to be recorded,
- a facility for verifying whether the indicated physical location is available,
- a facility for generating the visually detectable pattern at the indicated physical location on the basis of the second information, and
- a facility for storing pattern information on the optical record carrier, wherein the facility for verifying enables the facility for generating and the facility for storing if the physical location is available, wherein the pattern information comprises at least the first information Since the visually detectable pattern at the record carrier can be represented at a relatively course resolution at the record carrier as compared to the resolution with which the data is stored, in general the area for storing the pattern information can be substantially smaller than the area allocated by the pattern itself. For example the visually detectable pattern may be stored at a resolution of 1 to several hundred dots per $mm^2$, while computer readable data is stored at the record carrier at a resolution in the order of several Mbits/$mm^2$. For example the storage density for BD is up to 40M channel bits, which is equivalent to 30 Mbits user data.

In an embodiment the visually detectable pattern comprises a bitmap, wherein each pixel of the bitmap in the visually detectable pattern replaces a plurality of data-units on the record carrier, and the second information represents the bitmap with one data-unit for each pixel. As the bitmap can be represented in a computer readable format at a resolution much higher than the resolution with which the bitmap is represented as a visually detectable pattern to the user, the additional amount of area required for storage of the second information is substantially smaller than the area required for the pattern itself. The storage requirements for the first information also are limited. The first information may, for example, indicate an inner radius and an outer radius within which the visually detectable pattern is applied at the record carrier. The first information may additionally include a pair of angles tangential to the rotation axis of the record carrier within which the visually detectable pattern is arranged. Alternatively, the location of the visually detectable pattern may be specified in rectangular coordinates. In either case only a modest amount of data is required to represent the location of the visually detectable pattern. While the pattern information only requires a modest amount of storage area, it provides for a substantial increase of possibilities including allowing a user: to move the visually detectable pattern to another location on the record carrier, and to modify the content of the visually detectable pattern.

An even more compact storage of the second information of the visually detectable pattern is achieved if the visually detectable pattern is encoded. Accordingly in a preferred embodiment the visually detectable pattern comprises a sequence of characters whereas the second information comprises a code, e.g. an ASCI code representing the sequence of characters.

Alternatively, the visually detectable pattern comprises a graphics image, wherein the second information comprises a mathematical model for the image. The mathematical model may for example describe the image in basic shapes lake rectangles, circles, Bezier shapes, splines etc. The visually detectable pattern may comprise a combination of two or more of a sequence of characters, a graphics image and a bitmap, or other patterns.

Several options are possible to obtain the second information. The second information is, for example, generated automatically. For example the second information may include: a date of recording the record carrier, a name of a file present on the record carrier, or a pattern stored in a memory of an apparatus carrying out the method.

Alternatively the second information may be derived from user input (e.g., by a dialog presented to the user).

Likewise the first information may be generated automatically (e.g., always an inner ring of the record carrier may be selected as the location for the visually detectable pattern).

Alternatively the method may require a user input to determine a physical location. After the user is requested to input the desired physical location it should be verified whether the desired physical location is available at the record carrier. User input may be requested in a way known as such, e.g. by a dialog. If the verification points out that the desired location is available, the visually detectable pattern will be applied at said location. Otherwise the unavailability of the location may be signaled to the user. Additionally an alternative location could be presented.

The presence of the pattern information at the optical record carrier makes it possible to move the pattern to another location. Such a method for moving a visually detectable pattern at an optical record carrier according to the invention comprises the steps of:
  determining a desired physical location for the visually detectable pattern,
  generating the visually detectable pattern at the desired physical location on the basis of the second information stored at the record carrier,
  erasing the visually detectable pattern at the original location, and
  updating the first information.

In a preferred embodiment the step of determining a desired physical location further comprises the steps of:
  obtaining user input indicative for the desired location
  determining whether the desired location is available,
  if the desired location is not available, determining whether user data at the record carrier can be rearranged so as to make available the desired location,
  if the user data can be rearranged, rearranging the user data, and generating the visually detectable pattern at the desired physical location on the basis of the second information stored at the record carrier, and
  if the user data cannot be rearranged indicating this in an error message.

In this preferred embodiment the user does not need to consider whether the preferred location is available or not. The user simply indicates a preferred location and the method arranges that this location is available.

Since the location of the visually detectable pattern is stored in the first information, the user is able to remove the visually detectable pattern, with a method for deleting a visually detectable pattern at an optical record carrier comprising the steps of
  obtaining the first information indicative for the physical location of the visually detectable pattern, and
  erasing the physical location.

In addition the pattern information may be removed too. Alternatively this information may be kept, so that the user can easily undo the removal.

The presence of the pattern information further facilitates modification of the visually detectable pattern, according to a method for modifying a physical pattern comprising the steps of:
  obtaining the second information representative for the physical pattern from the optical record carrier,
  modifying the second information,
  generating a modified physical pattern at the optical record carrier on the basis of the modified second information.

According to a further aspect an apparatus for providing an optical record carrier comprises:
  a facility for receiving second information representing the visually detectable pattern to be recorded,
  a facility for receiving first information indicative for a physical location on the record carrier where the pattern is to be recorded,
  a facility for verifying whether the indicated physical location is available,
  a facility for generating the visually detectable pattern at the indicated physical location on the basis of the second information, and
  a facility for storing pattern information on the optical record carrier, wherein the facility for verifying enables the facility for generating and the facility for storing if the physical location is available, wherein the pattern information comprises the second information as well as the first information.

The visually detectable pattern is a non-standardized feature on the record carrier. The area comprising the visually detectable pattern contains data that is not machine interpretable. Very likely, no tracking signals, such as DPD or push pull signals, for servo control are generated when the read head accesses this area. That might cause unwanted compatibility problems with legacy drives. In a preferred embodiment the recorded record carrier is exchange-compatible with other drives. In other words it is desired that:

- the visually detectable pattern is not recorded on previously recorded areas,
- the effects of the visually detectable pattern do not impede normal players and drives for the record carrier,
- read access of the area with the visually detectable pattern is minimized, and
- an area containing a visually detectable pattern is unintended overwritten with new data.

Preferably the visually detectable pattern is applied in a way that is compatible with players that are not aware that the record carrier comprises the visually detectable pattern. This is preferably obtained in the way as described in the co-pending application P82008US00.

The optical record carrier may for example be an optical disc, e.g. one of the types CD-R, CD-RW, DVD+/-R, DVD+/-RW, BD-R, BD-RE, or HD-DVD-R, HD-DVD-RW, HD-DVD-RAM. Alternatively the optical record carrier may be another medium that can be read out with optical means, e.g. an optical card.

Various recording modes are possible at file system level, e.g. disc at once, multi-session, sequential with or without logical overwrite and random.

Various file systems are known to the skilled person for storing data at optical record carrier, including UDF, ISO, and BDFS. On top of the file system an application may be present such as DVD-Video.

BRIEF DESCRIPTION OF THE DRAWINGS

These and other aspects are described in more detail with reference to the drawings, wherein.

DETAILED DESCRIPTION OF THE DRAWINGS

Figure 1:
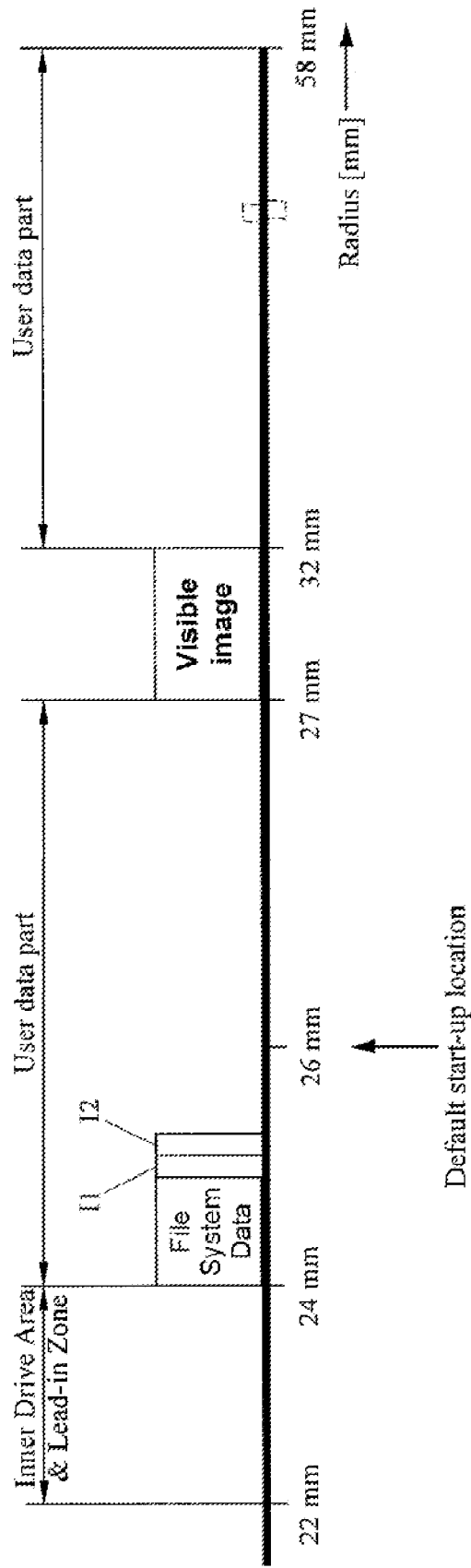
FIG. 1 schematically shows a cross-section of an optical record carrier according to the invention.

FIG. 1 in cross-section schematically shows an optical record carrier. The record carrier comprises a visually detectable pattern (visible image) at a physical location on the record carrier. In this case the visible location is a ring having an inner diameter of 27 mm and an outer diameter of 32 mm at the record carrier. The record carrier further comprises pattern information including first information I1 indicative for the physical location, as well as second information I2 representing the visually detectable pattern. The pattern information comprises an amount of data less than the amount of data equivalent to the area occupied by the visually detectable pattern at the record carrier.

The following pattern information may be stored.
The second information may include:
Font
Font size
Font style {Normal, Bold, Italic, Underline, SMALL-CAPS}
Character spacing {Normal, Condensed, Expanded}
Character position {Normal, Raised, Lowered}
the actual label text The number of bytes to store per text-label is very limited; we assume 256 bytes per label.

The first information indicating the physical location may include:
Start PSN (physical sector number indicating the inner radius of the physical location); and
End PSN (physical sector number indicating the outer radius of the physical location).

More than one visually detectable pattern may be displayed at the record carrier. In that case the number of labels on the medium should also be stored.

To memorize the second and first information of each visually detectable pattern on the disc, numerous possibilities are available. The second and first information may be arranged for example in a file system which can be stored on the optical record carrier, or in the apparatus, e.g. in a separate hard disc of the apparatus.

The UDF file system on rewritable media maintains a structure that indicates the state of the medium; it indicates the number of files, the number of directories, whether the volume is dirty, etc. These data are maintained in the Logical Volume Integrity Descriptor, which is updated each time the disc is removed from the drive or the system it runs on shutsdown. This descriptor has 2048 bytes of room of which about 120 bytes are being used. This leaves room for the pattern information also denoted as Label Allocation Data of about 7 text-labels.

More in particular it is explained how the pattern information may be stored at a DVD+RW and a DVD-RW by the drive.

Figure 2:
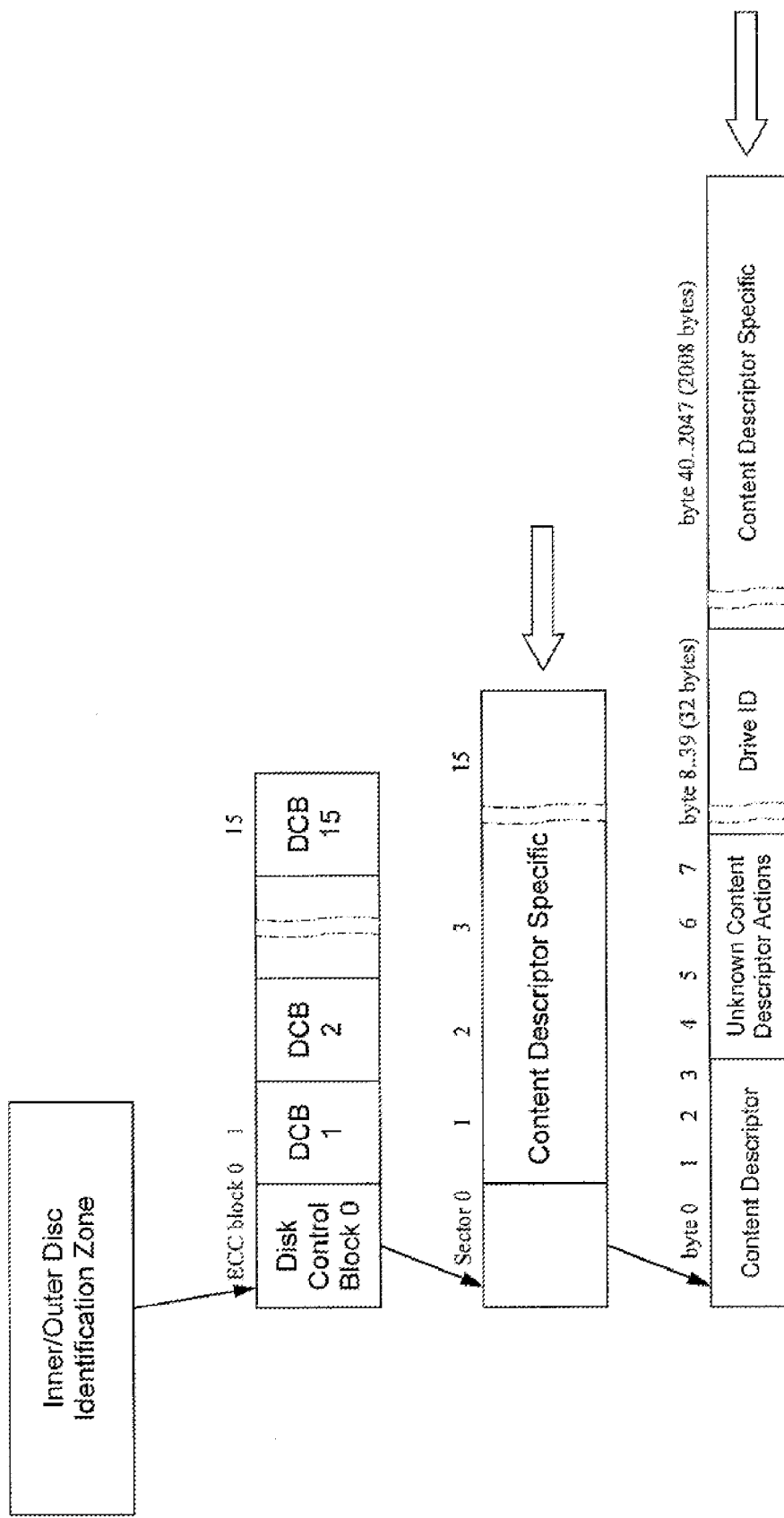
FIG. 2 shows in more detail application of the invention in a record carrier of the type DVD+RW.

The storage of DVD+RW data is illustrated with reference to FIG. 2. As shown therein, this medium contains a Disc Identification Zone (actually two, one at the inner side and one at the outer side of the recordable area) that holds 15 Disc Control Blocks (DCB) that are stored in an ECC block. In an embodiment one or more of these disc control blocks may be used to store the pattern information. This leaves room for the Label Allocation Data of more than 125 text-labels.

Figure 3:
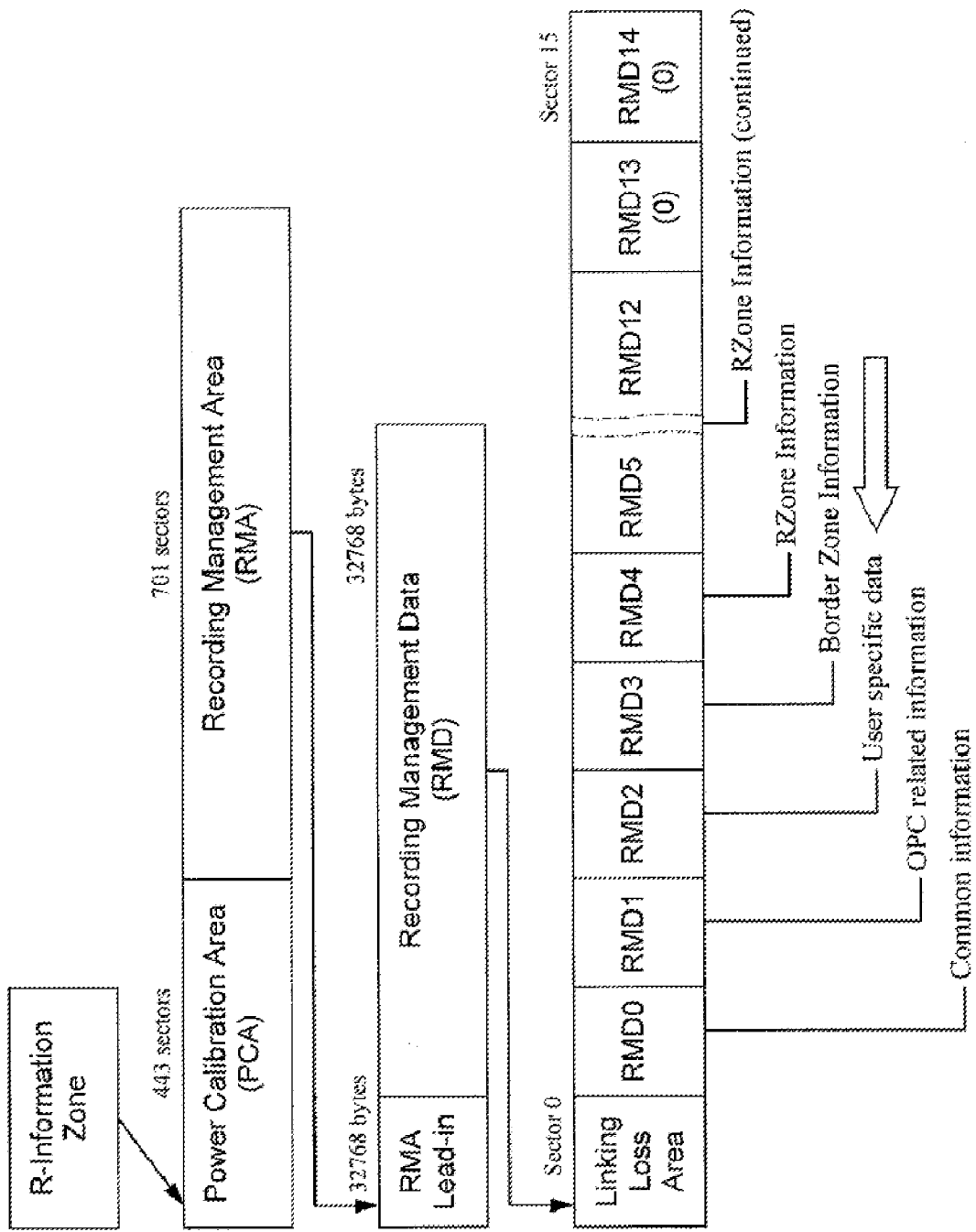
FIG. 3 shows in more detail application of the invention in a record carrier of the type DVD-RW, FIG. 4 schematically shows an apparatus according to the invention.
Figure 7:
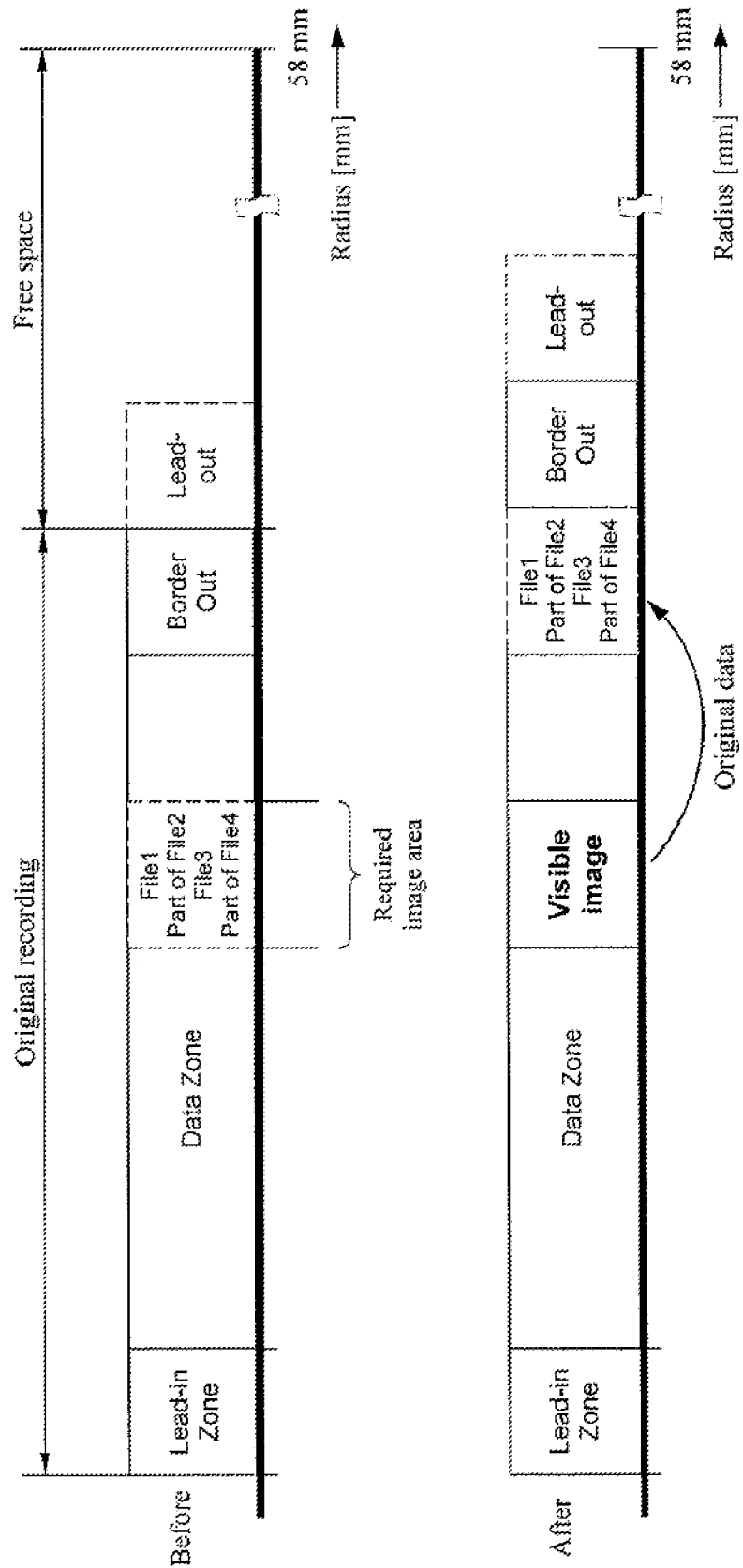
FIG. 7 shows a still further aspect of a record carrier of the invention.

FIG. 3 shows by way of example how the pattern information may be stored on a DVD-RW medium. This medium administers its state in the R-Information Zone, more precisely in the Recording Management Area. This area holds 15 Recording Management Data sectors of which one is reserved for User Specific Data; this RMD block will be used for label administration. FIG. 7 shows this. This leaves room for the Label Allocation Data of about 7 text-labels, if we take an identifier into account for identification of the labels.

In the above examples the pattern information is stored at the record carrier. Alternatively the pattern information may be stored in a permanent memory of the apparatus for recording the record carrier.

Figure 4:
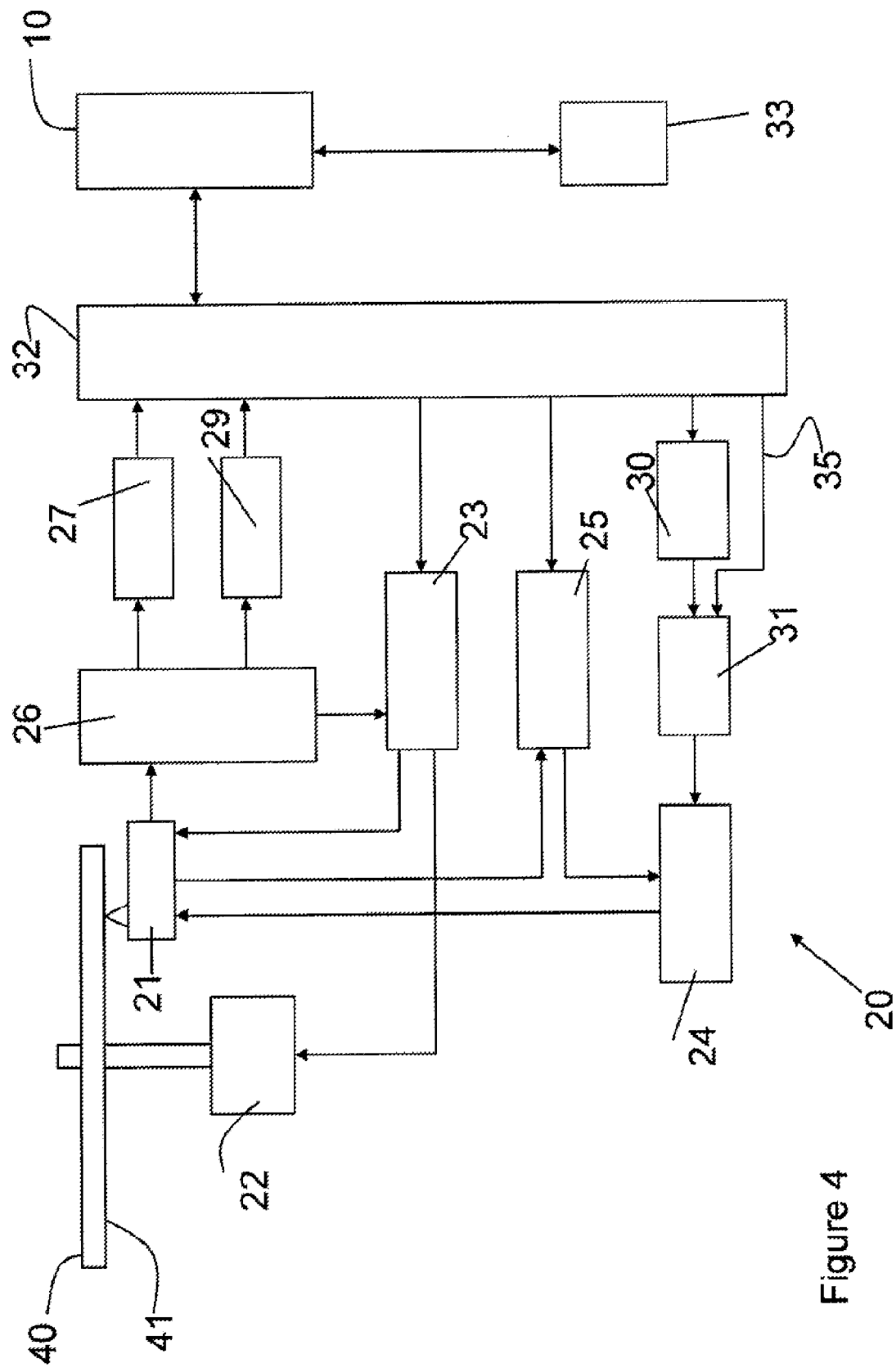

A system comprising the apparatus 20 and a host processor 10, coupled thereto is shown in FIG. 4. As shown therein, the drive 20 comprises a read/write head 21 to read optically detectable information from the record carrier 40 and to provide an output signal representative for the information read from the record carrier to an RF processing circuit 26. The read/write head 21 is movable relative to the record carrier 40 by means comprising a spindle motor 22 for rotating the record carrier 40 and further means, e.g. a slide and a radial actuator (not shown) for radially displacing the read/write head 21 relative to the record carrier 40. A servo circuit 23 controls the relative movement of the read/write head 21 with respect to the record carrier 40. The RF processing circuit 26 decomposes the signal obtained from the read/write head 21 into a first output signal that is provided to a decoder circuit 27, which decodes the first output signal into a digital signal representative for the data stored on the record carrier 40. The RF processing circuit provides a second output signal to an address detection circuit 29 that determines the address at the record carrier that is currently accessed by the read/write head 21. The data obtained by decoder circuit 27 and the address determined by address detection circuit 29 is provided to general controller 32. With this information the controller 32 controls the servo circuit 23.

Data is written on the record carrier 40 by an encoder 30, write strategy unit 31, a driver 24, and the read/write head 21. The data to be written is encoded by encoder 30. The encoding may include an error protection encoding (e.g. Reed-Solomon) and a channel encoding (e.g. an EFM coding). The encoded signal is provided to the write strategy unit 31 that calculates a required modulation of a signal to be sent to the read/write head in order to optimally represent the encoded signal. This is dependent on the type of record carrier used, e.g. whether the record carrier comprises an active layer on the basis of a phase change material, a dye etc.

The driver 24 converts the output signal into a signal suitable to drive a write facility of the read/write head. Usually the write facility comprises a laser and a lens system for providing a focused beam on the record carrier 40. A laser power controller 25 further regulates the actual power applied to the write facility. The laser power controller 25 monitors the intensity of the laser beam in response to the signal provided by the driver 24 and adjusts the driver to compensate for temperature changes and temporal deterioration of the laser in the read/write head.

The apparatus comprises a permanent memory 33 that is arranged for storing pattern information for a plurality of record carriers. The host processor 10 may carry out higher-level applications. The host processor 10 may be a separate module, but may alternatively be integrated in the apparatus.

The components in the second module 20 forming the facility for generating the visually detectable pattern at the record carrier 40 are substantially the same as those used for recording machine readable data. As for the machine readable data the visually detectable pattern is generated at a recording layer 41 of the record carrier 40 by modulating an intensity of the laser beam from the read/write head 21 while providing a relative displacement between the read/write head 21 and the record carrier 40. Unlike the procedure for machine-readable data, the signal controlling the intensity of the laser beam need not comply with the channel code for recording machine-readable data. Hence the encoder 30 may be bypassed by bypass 35.

Figure 8:
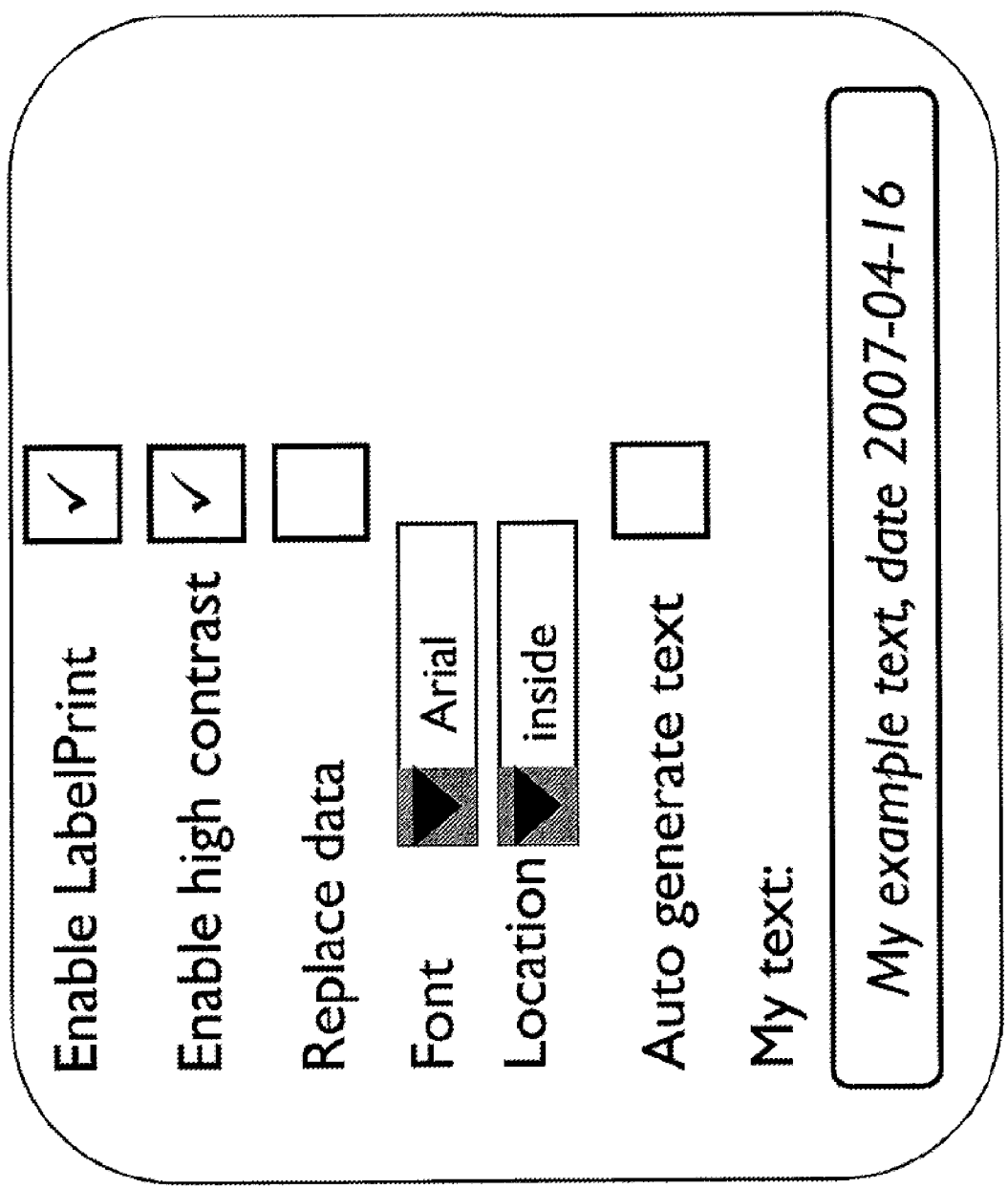
FIG. 8 shows an example of a user interface for use in a method according to the invention.

A facility for storing pattern information comprises firmware in the general controller 32 that enables the second module to store the pattern information in a selected area of the record carrier 40, for example in Disc Control Blocks (DCB) of a DVD+RW data as illustrated with reference to FIG. 2 or an RMD block of a DVD-RW as shown in FIG. 3. Alternatively the facility for storing pattern information may comprise a process carried out by the host processor 10, which stores the pattern information as a user file on the optical record carrier 40. The apparatus is arranged to perform various task as claimed. The tasks may be carried out by dedicated hardware, but are preferably executed by firmware operating on the general controller 32 (e.g. for lower level tasks related to components of the drive 20) or by software (e.g. for the higher level tasks related to the application) executed on the host processor 10. The software executed on the host processor 10 has a user interface for requesting a user to provide information related to the visually detectable pattern to be printed as shown in FIG. 8, for example. The user can select the location for the visually detectable pattern (first information) and set the visually detectable pattern (second information).

Several examples will now be described in more detail, e.g. writing, modifying and moving a visually detectable pattern (label) on an optical record carrier.

Figure 5:
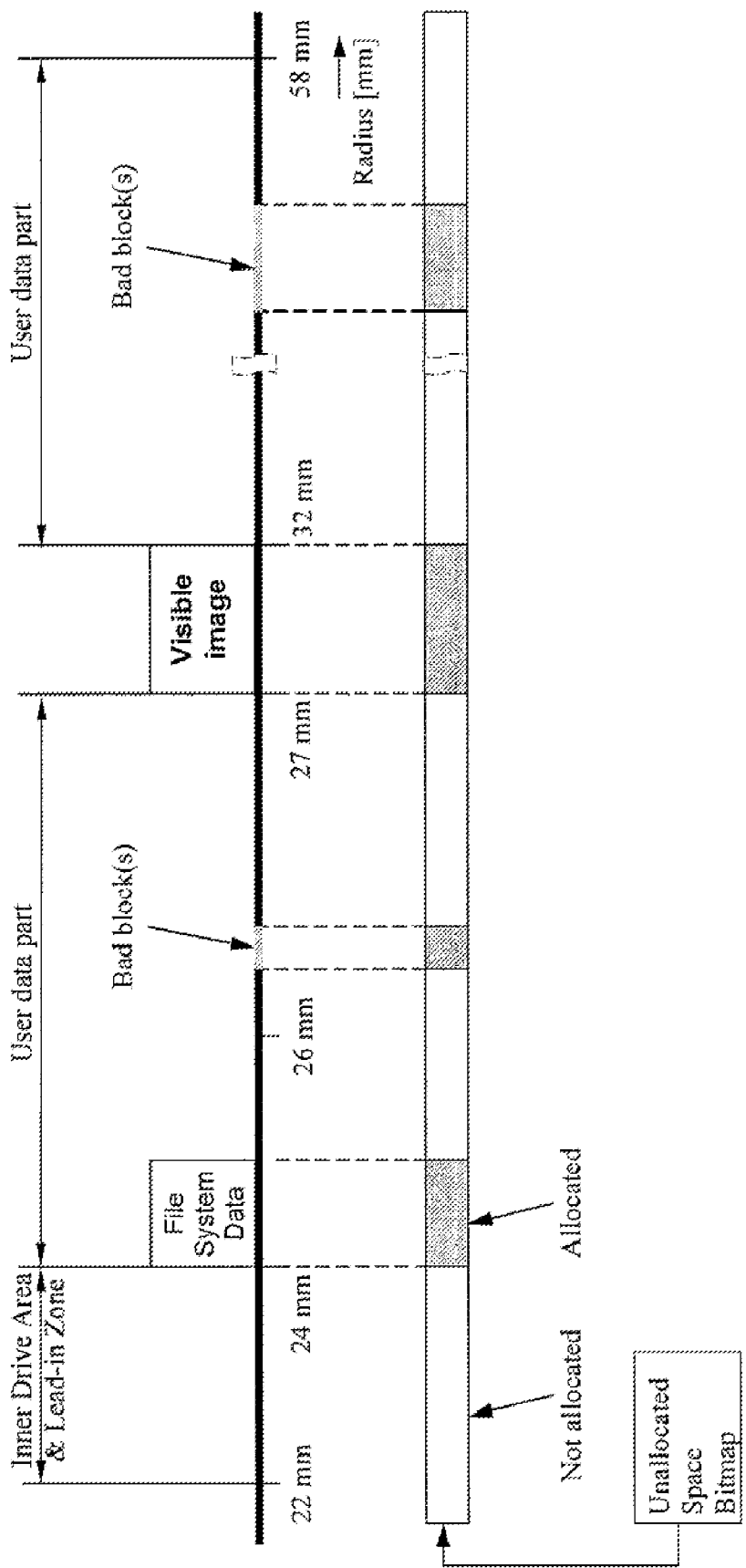
FIG. 5 shows a further aspect of a record carrier of the invention.

FIG. 5 gives an overview on how the Unallocated Space Bitmap is applied. FIG. 5 shows an overview of a fully formatted RW medium with the contents of the Unallocated Space Bitmap. Allocated data and bad blocks are registered in the bitmap. By also registering the range of ECC blocks that an image occupies, read-out and/or recording image data is prevented. The image itself may or may not be recorded.

A DVD+/-RW disc may be formatted in a standard way; i.e. no room for an image needs to be reserved. A standard formatted medium may however be converted to a record carrier according to the invention disc by the following actions:

Ask the user for a text to write (provide the second information)
If the default label location (first information) is occupied with files:
 i. Abort the request or:
 ii. Move the files to another location
Calculate the number of required ECC blocks
Mark these blocks as allocated in the Unallocated Space Bitmap
Write the label By retrieving the pattern information from the record carrier or from the permanent memory in the apparatus for writing the record carrier the location of the visually detectable pattern can be determined, and the pattern can be removed as follows:

mark the ECC blocks of the label as non-allocated in the Unallocated Space Bitmap, and
erase the visually detectable pattern from the disc.

Disc at Once, or Uninterrupted recording, is characterized by the fact that the recording will be done in one action. This includes Lead-in, data, and Lead-out. The contents of such a disc are considered frozen, however, since the medium is rewritable, the data can be altered as long as the disc ends up in a consistent state regarding file system and disc structures.

If the disc is not fully recorded, below holds:
Ask the user for a text to write (second information),
Ask the user for a physical location (first information) to apply the visually detectable pattern, or determine a default location.

If the selected location is occupied with files:
  i. Abort the request or:
  ii. Move the files to the Lead-out location
Calculate the number of required ECC blocks
Mark these blocks as allocated in the Unallocated Space Bitmap
Write the label
Rewrite the Lead-out
Update the disc administrating fields (Control Data Zone/Recording Management Area's, etc) to store the pattern information at the disc
Update the file system data This section describes the application of the invention for Sequential or Packet recording where multiple labels can be recorded. To do this, an administrative measure is required in order to find each label location and the text that is written into it. This structure requires that pattern information (Label Allocation Data) is available for each of the labels, as is described above.

The procedure for applying a label as a visually detectable pattern in or at a recording layer of the record carrier is as follows.
  Ask the user for a text to write (second information
  Ask the user for the radius to write the label (first information)
  If the requested label location is already occupied with files:
    i. Abort the request or:
    ii. Request the user to specify another radius or:
    iii. Move the files to another location
  Calculate the number of required ECC blocks
  Mark these blocks as allocated in the Unallocated Space Bitmap
  Add the label information to the Label Allocation Area
  Write the label A record carrier according to the invention with reserved or written labels can be converted to a normal disc, i.e. to save on storage space. Effectively the user wants to erase all labels in this situation. The following actions have to be performed for each label:
  Fetch the location (first information) of the requested label from the Label Allocation Data
  Remove the label information from the Label Allocation Area
  Mark the ECC blocks of the label as non-allocated in the Unallocated Space Bitmap
  Go to the location of the requested label
  Erase the label from the disc A label may be moved from one location to another. This requires the next steps of:
  Ask the user to specify the label number if there is more than one label.
  Fetch the location (first information) of the requested label from the Label Allocation Data
  If applicable mark the ECC blocks of the old label as non-allocated in the Unallocated Space Bitmap
  Go to the location of the old label
  Erase the old label
  Remove the label information from the Label Allocation Area
  Ask the user for a new text to write (new second information)
  Ask the user for a new radius to write the new label (new first information)
  If the new location is occupied with files:
    i. Abort the request or:
    ii. Request for another radius or:
    iii. Move the files to the old label location (or another session)
  Calculate the number of required ECC blocks
  Mark these blocks as allocated in the Unallocated Space Bitmap
  Add the label information to the Label Allocation Area
  Write the new label In order to delete an arbitrary label from the disc, the following steps are required:
  Ask the user to specify the label number if there is more than one label.
  Fetch the location of the requested label from the Label Allocation Data
  Remove the label information from the Label Allocation Area
  Mark the ECC blocks of the label as non-allocated in the Unallocated Space Bitmap
  Go to the location of the requested label
  Erase the label An existing label on a medium may be changed by overwriting. This requires the following actions:
  Ask the user the label number
  Ask the user for a new text to write
  Fetch the location of the requested label from the Label Allocation Data
  Update the label information in the Label Allocation Area
  Go to the location of the requested label
  Overwrite the label A further embodiment relates to applying multiple labels in the case of Disc at Once recording. The Label Allocation Area is used for this purpose (see above)

This will be impossible when the disc is completely recorded, since additional area is needed for such an operation. It is strictly spoken also impossible when a not-completely recorded disc is finalized without the possibility of appending a session.

Users are able to place a label on an arbitrary location on the disc, as long as the minimum radius of 27 mm is obeyed and as long as there is enough free space for files that occupy the required label locations, since they must be moved. If there is enough free space, the method according to the invention will create a new data area, or session, to store those files. One has to distinguish between DVD+RW and DVD-RW since the way of creating sessions is different.

Figure 6:
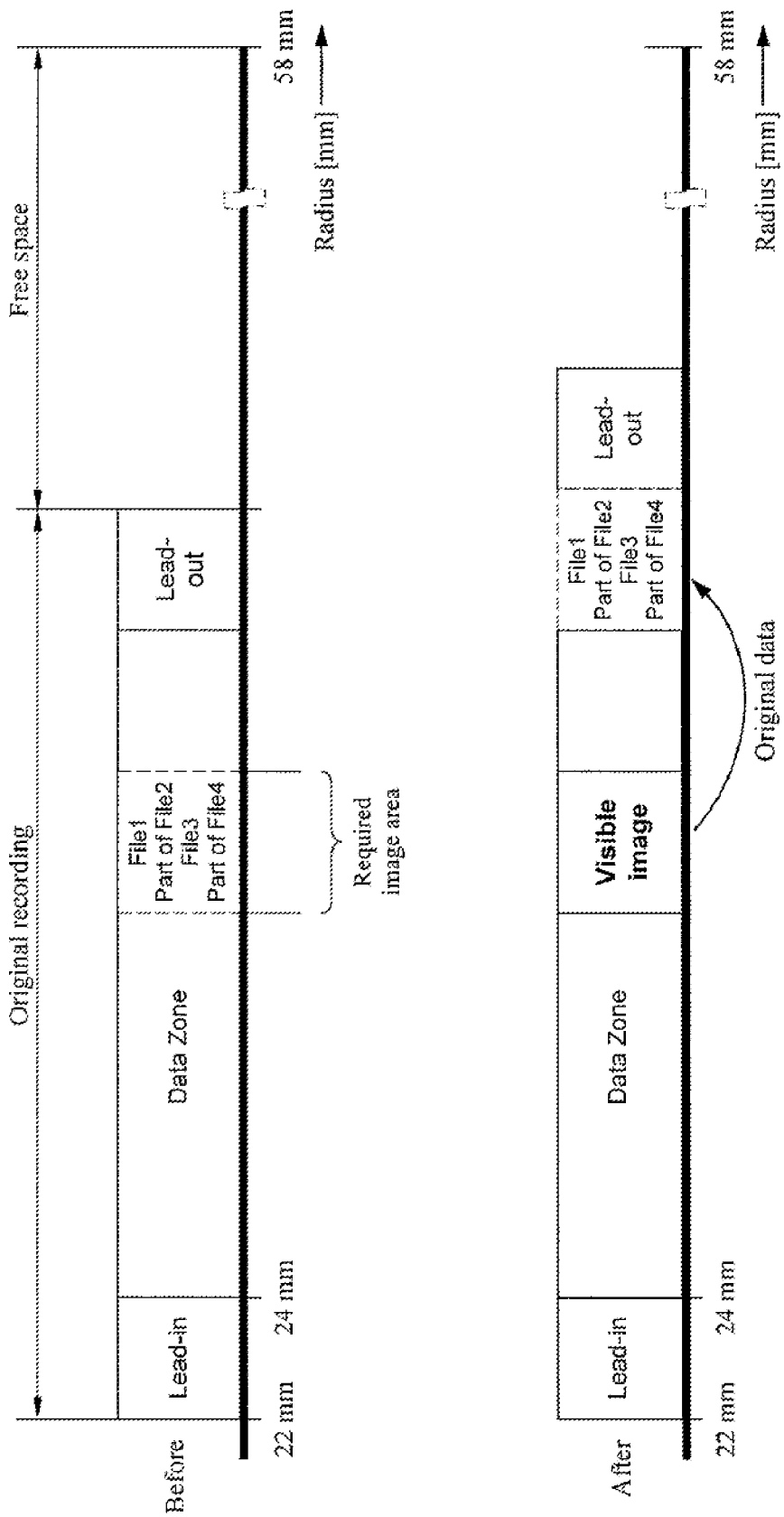
FIG. 6 shows a further aspect of a record carrier of the invention.

FIG. 6 shows an example of a DVD+RW disc before and after the label is applied. It shows the effect of data moving. A DVD+RW disc only knows the concept of Lead-in and Lead-out.

The required actions are:
  Ask the user for text to write (second information)
  Ask the user for the radius to write the label (first information)
  If the supplied location is occupied with files:
    i. Abort the request or:
    ii. Copy the files to the Lead-out location
  Calculate the number of required ECC blocks
  Mark these blocks as allocated in the Unallocated Space Bitmap (if backwards compatibility is desired)
  Add the label information (pattern information) to the Label Allocation Area
  Write the label
  Write a new Lead-out
  Update the disc administrating fields (Control Data Zone—Last Recorded Sector, etc)
  Update the file system fields (Allocation Descriptors, Logical Volume Integrity Descriptor, etc)

This section describes how to move data on a DVD-RW disc. A DVD-RW disc knows the concept of Lead-in and Lead-out, but also of Border-in and Border-out. Therefore, a Data Zone can be terminated by any of:
Lead-out
HF with Lead-out attribute
Border-out
Border-out+Lead-out The principle of moving data however is similar to that of DVD+RW, with the exception of the zones to rewrite (Lead-out or Border-out) and the disc administrating fields.

FIG. 7 shows an example of a DVD-RW disc before a label is being applied and after the label is applied. It shows the effect of data moving in the case of a Border-out. If a Lead-out is present on the medium, it shall be moved by the same amount as the Border-out. A Lead-out is shown dashed, as it may or may be not recorded. However, if it was recorded, it will be moved back by the same amount as the Border-out.

The required actions are the following:
Ask the user for a text to write (second information)
Ask the user for the radius to write the label (first information)
If the supplied location is occupied with files:
  i. Abort the request or:
  ii. Copy the files to the Border-out/Lead-out location
Calculate the number of required ECC blocks
Mark these blocks as allocated in the Unallocated Space Bitmap
Add the label information to the Label Allocation Area
Write the label
Write a new Border-out/Lead-out
Update the disc administrating fields (Recording Management Area's, etc)
Update the file system fields (Allocation Descriptors, Logical Volume Integrity Descriptor, etc)

Figure 9:
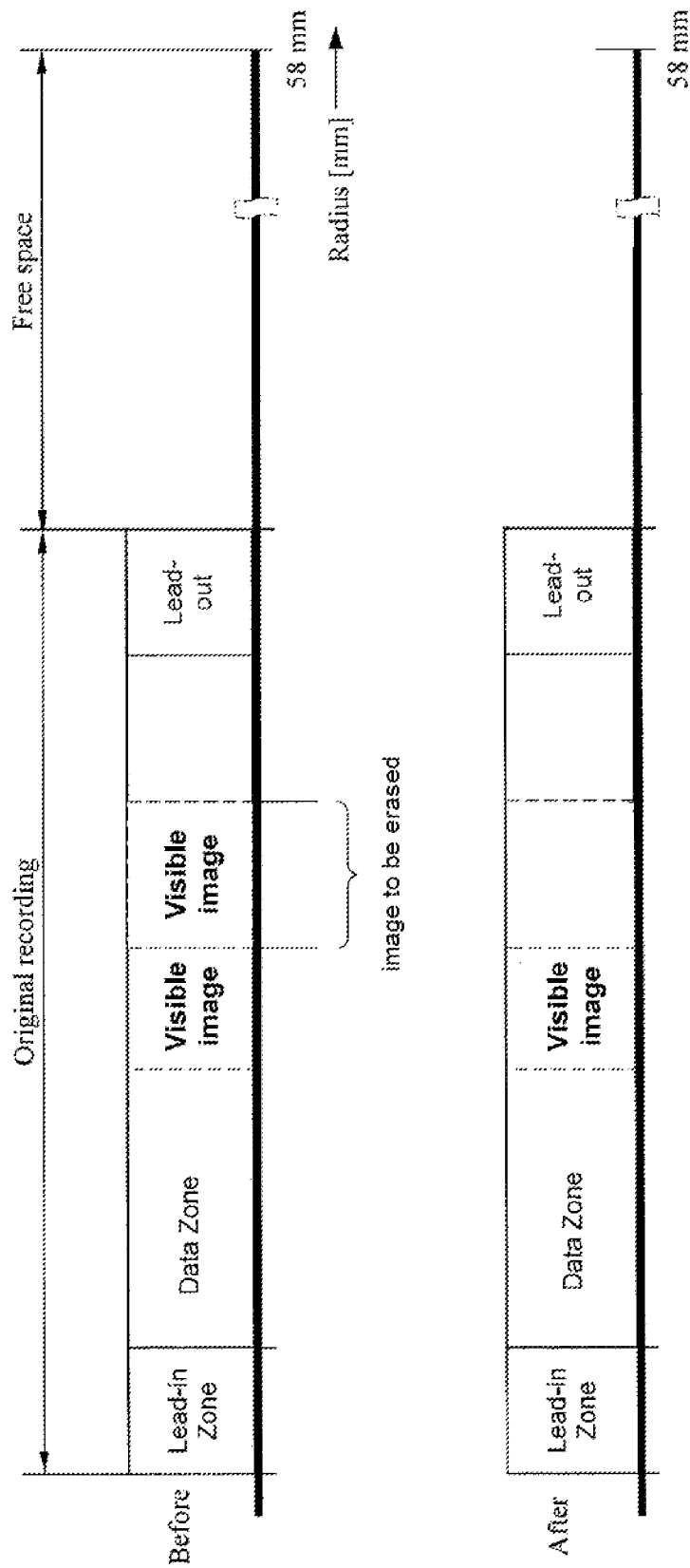
FIG. 9 shows a still further aspect of a record carrier of the invention.
Figure 10:
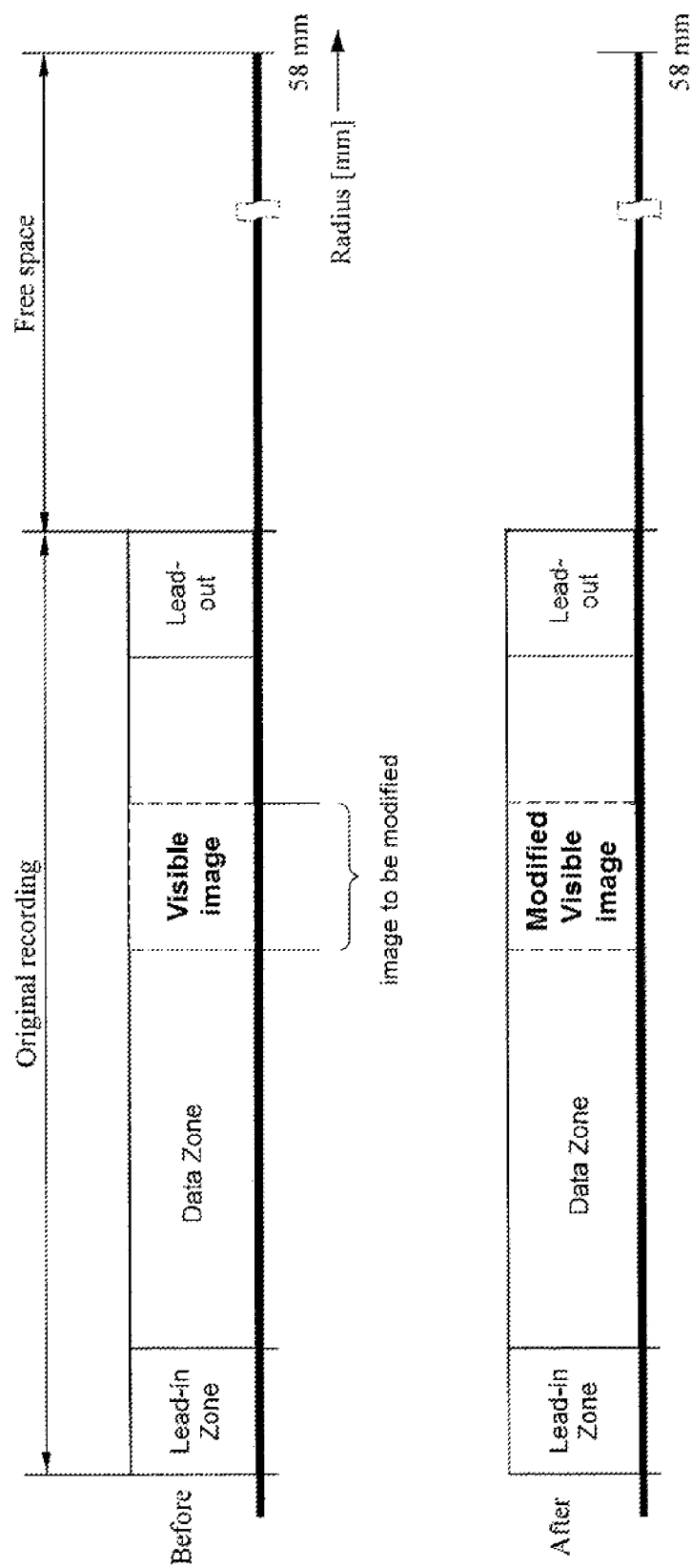
FIG. 10 shows a still further aspect of a record carrier of the invention.

Moving a label from one location to another is possible with the next steps.
Ask the user the label number
Fetch the location of the requested label from the Label Allocation Data
Go to the location of the requested label
Erase the old visually detectable pattern from the disc
Mark the ECC blocks of the label as non-allocated in the Unallocated Space Bitmap
Ask the user for a new text to write
Ask the user for a new radius to write the new label
If the new location is occupied with files:
  i. Abort the request or:
  ii. Request for another radius or:
  iii. Move the files to another location
Calculate the number of required ECC blocks
Mark these blocks as allocated in the Unallocated Space Bitmap
Add the label information to the Label Allocation Area
Write the label FIG. 9 shows an example of a DVD-RW disc before a label is being erased and after the label is erased. An arbitrary label may be deleted from the disc with the following steps:
Ask the user the label number
Fetch the location of the requested label from the Label Allocation Data
Mark the ECC blocks of the label as non-allocated in the Unallocated Space Bitmap
Remove the label information from the Label Allocation Area
Go to the location of the requested label
Erase the label FIG. 10 shows an example of a DVD-RW disc before a label is being modified and after the label is modified. An existing label on a medium may be changed by overwriting with the following actions:
Ask the user the label number
Ask the user for a new text to write
Fetch the location of the requested label from the Label Allocation Data
Go to the location of the requested label
Overwrite the label
Add the new label information to the Label Allocation Area FIG. 8 shows a practical embodiment of a user interface for requesting a user to provide information related to the visually detectable pattern to be printed.

With a first selection box (Enable LabelWrite) the user can enable or disable the feature of writing a visually detectable pattern to the disc.

With a second selection box (Enable high contrast) the user can increase the visible contrast, for example by using a twice time slower recording mode.

In the case of rewritable disc, it can be indicated with "Replace data" whether the original data should be moved to another empty location of the disc. In the case of a text-TAG, this information can also be edited as the data itself is stored on the disc too.

The user can select a location for the label (first information).

Second information representing the visually detectable pattern (label) can be provided by the user as follows.

The user can select a font, e.g. Arial. In most user cases, the label can be placed on any available location, but inside is preferred because it consumes the least capacity per character height With a further selection box (Auto generate text) the user can select the option to have the label generated automatically. For example, in frequent cases the label only contains the disc creation data and the main file type like .jps indicating that the record carrier contains photos. In that case the automatically generated is label is for example: "photos Mar. 15, 2007"

If the content for the label is not automatically generated the user can for example specify a text below "My text:"

While the invention has been illustrated and described in detail in the drawings and foregoing description, such illustration and description are to be considered illustrative and exemplary and not restrictive; the invention is not limited to the disclosed embodiments. While the invention is described herein for a single sided record carrier the invention is equally applicable to a record carrier having a recording layer on both sides. In that case the pattern information for a visually detectable pattern is preferably stored at the same side as the visually detectable pattern itself.

Other variations to the disclosed embodiments can be understood and effected by those skilled in the art in practicing the claimed invention, from a study of the drawings, the disclosure and the appended claims. For example, although in particular a disc shaped record carrier is described, other shapes are possible (e.g., record carriers in the shape of a credit card). In that example, the visually detectable pattern may for example indicate the amount of credit currently available to the user. In the claims the word "comprising" does not exclude other elements or steps, and the indefinite article "a" or "an" does not exclude a plurality. A single processor or other unit may fulfill the functions of several items recited in the claims. The mere fact that certain measures are recited in mutually different claims does not indicate that a combination of these measures cannot be used to advantage. Any reference signs in the claims should not be construed as limiting the scope.

What is claimed is:

1. A method for updating a visually detectable pattern at an optical disc, comprising the steps of:
    determining a first information of a desired physical location for the visually detectable pattern and a second information representing the visually detectable pattern,
    determining whether the desired location is available,
    if the desired location is available, generating the visually detectable pattern at the desired physical location on the basis of the first information and the second information,
    if the desired location is not available, determining whether the user data at desired location can be rearranged so as to make the desired location available,
    if the user data can be rearranged, rearranging the user data, and generating the visually detectable pattern at the desired physical location on the basis of the first information and second information, and
    if the user data cannot be rearranged, indicating this in an error message and updating the first information.

2. A method for deleting a visually detectable pattern at an optical disc, comprising the steps of:
    obtaining a first information from the optical disc indicative for the physical location of the visually detectable pattern,
    asking the user to specify the pattern number if there is more than one pattern,
    fetching the location of the requested pattern from the Label Allocation Data on the optical disc,
    removing the pattern information from the Label Allocation Area on the optical disc,
    marking the ECC blocks of the pattern as non-allocated in the Unallocated Space Bitmap on the optical disc,
    going to the location of the requested pattern, and
    erasing the pattern.

3. A method for modifying a physical pattern at an optical disc, comprising the steps of:
    obtaining a first information from the optical disc indicative for the physical location of the recorded visually detectable pattern,
    obtaining a second information from the optical disc representative for the recorded visually detectable physical pattern from the optical disc,
    modifying the second information, and
    generating a modified physical pattern at the optical disc on the basis of the modified second information and the first information.

* * * * *